United States Patent Office 2,730,543
Patented Jan. 10, 1956

2,730,543

FLUORINATED NITRILES

John L. Rendall, St. Paul, and Wilbur Pearlson, Bald Eagle, White Bear Township, Minn., assignors to Minnesota Mining & Manufacturing Company, St. Paul, Minn., a corporation of Delaware No Drawing. Application May 20, 1950,
Serial No. 163,331

1 Claim. (Cl. 260—465.7)

The present invention relates to fluorinated carbon compounds and to the production thereof. More particularly our invention is concerned with a novel method of making unsaturated fluorocarbon acids and their derivatives, and we are especially concerned with the production of perfluoroacrylic acid and its derivatives, e. g. its ester, amide, nitrile and anhydride derivatives.

No one prior to our invention, to our knowledge, has ever made perfluoroacrylic acid or the anhydrides, amides or esters thereof. There has previously been a suggestion of a method for the production of perfluoroacrylonitrile, $CF_2=CFCN$, but all prior methods suggested for this purpose, which are now employed, have one shortcoming or another, such as lack of economic feasibility, poorness of yield, impractical choice of raw materials, an undue number of steps of process or such like. For example Chaney U. S. Patent No. 2,439,505 may be noted as of general interest in connection with perfluoroacrylonitriles and their production. Also see Chaney U. S. Patent No. 2,456,768, which describes a series of steps of operation which are said to lead to materials which may further be processed by Chaney as described in his first-mentioned Patent No. 2,439,505.

Other methods have heretofore been suggested for making various fluorocarbon compounds which involve direct fluorination, but these operations are difficult to control and involve rather considerable hazards of operation.

Our invention involves a number of advantages over the prior art methods and suggestions known to us.

By starting with an unsaturated fluorocarbon having three or more carbon atoms, and having a terminal carbon atom joined to the adjacent carbon atom by a doubled bond, $R_fCF_2CR'_f=CF_2$, we can react the same with an alcohol to produce an ether of the formula $$R_fCF_2CR'_fHCF_2OR$$

where R is a hydrocarbon group, e. g. a methyl group. We are able to convert such an ether, by hydrolysis, into the corresponding ester, $R_fCF_2CR'_fHCOOR$. The $R_f$ and $R'_f$ groups are either fluorine or perfluorocarbon groups, such as $CF_3$, $C_2F_5$, etc.

The ester just mentioned is a completely novel carbon-fluorine compound, insofar as we are aware, and it has a number of uses. For example, such an ester may be used as a basis for further reactions to produce other carbon-fluorine compounds. For example, it can be treated with ammonia to yield $R_fCF_2CR'_fHCONH_2$, which is a novel amide; or such ester may be reacted with a primary or secondary amine, in lieu of ammonia, to yield the corresponding amides, which are also novel. The unsubstituted amides, i. e., $R_fCF_2CR'_fHCONH_2$, may be dehydrated to yield the corresponding novel nitriles. For example the amide produced by reacting the ester with ammonia may be dehydrated to yield $R_fCF_2CR'_fHCN$, and this compound, in turn, may be dehydrofluorinated to yield the corresponding alpha beta unsaturated perfluoronitrile, i. e. $R_fCF=CR'_fCN$. In the compound just given, where $R_f$ and $R'_f$ are fluorine, the compound is perfluoroacrylonitrile. The latter compound may be hydrolyzed to yield perfluoroacrylic acid, or where the $R_f$ and $R'_f$ groups are perfluorocarbon groups instead of fluorine, the hydrolysis step will yield the other corresponding unsaturated perfluoro acids. The unsaturated esters, of the formula $R_fCF=CR'_fCOOR$, may be produced by reacting the corresponding perfluoro unsaturated acid with a compound of the formula ROH, where R is a hydrocarbon group (e. g. with an alcohol), or by direct treatment of the corresponding nitrile with a compound of the formula ROH, as just described above.

Again starting with the ester above mentioned, namely $R_fCF_2CR'_fHCOOR$, we have been able to hydrolyze this compound to yield $R_fCF_2CR'_fHCOOH$, it being understood that $R_f$ and $R'_f$ may be either fluorine or a perfluoro hydrocarbon group. This compound is also entirely novel, insofar as we are aware. Among its uses is to employ it as an intermediate from which, by dehydrofluorination, we are able to produce $$R_fCF=CR'_fCOOH$$

As aforesaid, where the $R_f$ and $R'_f$ are each fluorine, the compound is perfluoroacrylic acid.

Again employing the ester above mentioned, namely $R_fCF_2CR'_fHCOOR$, we have found that by dehydrofluorination of the same we can directly produce esters of unsaturated perfluoro acids, namely, $$R_fCF=CR'_fCOOR$$

Employing the $R_fCF_2CR'_fHCONH_2$, above mentioned, we have been able, by direct dehydrofluorination, to produce the unsaturated perfluoroamide. Where the $R_f$ and $R'_f$ are fluorine, the unsaturated perfluoroamide is, specifically, perfluoroacrylamide. The reaction just mentioned, at the same time, also yielded substantial quantities of $R_fCF=CR'_fCN$.

It will be noted that the reactions of our invention, herein described, are concerned to an important extent with the production of alpha beta unsaturated perfluoro acids and their derivatives, for example to the production of perfluoroacrylic acid and its derivatives. Our invention is not concerned with the production of acids where the fluorocarbon group joined to the carboxyl carbon contains a single carbon atom.

The compound $CHClFCOOH$, for example, has been produced in the past (see Young et al., Jol. Amer. Chem. Soc., vol. 71, page 2432, 1949) as by the reaction of trifluorochloroethylene, $CFCl=CF_2$ (which is not a perfluorocarbon compound), with methyl alcohol, to yield the ether $CFClHCF_2OCH_3$. Upon hydrolysis of the compounds just mentioned, there is produced $$CFClH-CO_2CH_3$$

which is an ester of a two-carbon acid and is a saturated compound, from which our type of unsaturated compounds cannot be prepared, insofar as we are aware.

Our process, as already illustrated, leads to perfluoro acids having a double bond between the alpha and beta carbon atoms, and to various derivatives thereof, as already discussed, as well as to novel intermediates above referred to.

We have previously described the use of $$R_fCF_2CR'_f=CF_2$$

as the starting material, for reaction with a compound of the formula ROH, where R is a hydrocarbon group. Instead of reacting the perfluoroolefin with ROH, we have found that we can react it with an amine, such as $HNR_2$, and thereby produce an amine of the formula $$R_fCF_2CR'_fH-CF_2$$
$$|$$
$$NR_2$$

This latter compound can then be hydrolyzed to yield the corresponding amide, which latter can be dehydrofluorinated to yield the corresponding unsaturated amide, e. g.

$$R_fCF=CR'_fC=O$$
$$\quad\quad\quad\quad |$$
$$\quad\quad\quad\quad NR_2$$

Also we have found that we can react perfluoroolefins with mercaptans, RSH, to produce thio-ethers of the formula $R_fCF_2CR'_fHCF_2SR$. Hydrolysis of these compounds yields the corresponding thio-esters, $$R_fCF_2CR'_fHCOSR$$

These can likewise be dehydrofluorinated to yield the corresponding unsaturated esters.

Having already described and illustrated the various steps and reactions contemplated in our invention, we will now further illustrate our invention in connection with the reaction of certain particular reactants in the production of certain definite products. We will take the case where the starting material $R_fCF_2CR'_f=CF_2$ is $CF_3CF=CF_2$, i. e. $C_3F_6$.

Through a solution of 10% potassium hydroxide in methanol was bubbled 1924 grams of crude $C_3F_6$, the temperature during the reaction being about 30° C. The alcohol solution was poured over crushed ice and the lower layer separated, washed twice with ice water, dried over phosphorous pentoxide and fractionated. A 1200 gram fraction was obtained which boiled at 53.7° C. (743 mm.) with a refractive index: $n_D^{20}=1.2802$. This was identified as the ether $CF_3CFHCF_2OCH_3$.

To hydrolyze the ether, 730 grams was added slowly to 900 grams of 96% sulfuric acid, the temperature being kept below 10° C. by cooling. The temperature was then allowed to warm to room temperature, while the mixture was stirred vigorously. Stirring was continued overnight, by which time the fluorinated phase had dissolved.

The mixture was then poured over 3000 grams of crushed ice, the lower layer separated, washed and distilled. A fraction boiling at 95.0–95.3° C. was identified as $CF_3CFHCO_2CH_3$. It had a refractive index of $n_D^{20}=1.3198$.

A portion of the ester, 440 grams, was dissolved in 640 cc. of diethylether, and cooled to 0° C. Anhydrous ammonia was bubbled into the stirred solution as fast as the gas could be absorbed. The amide precipitated in the form of white crystals and was recovered in 98% yield. The material was substantially pure $$CF_3CFHCONH_2$$

melting without further purification at 58–60° C.

Dehydration of the amide $CF_3CFHCONH_2$ was accomplished by the addition of an excess of either $P_2O_5$ or $PCl_5$ and heating until volatile compounds were evolved. The reaction starts at about 50° C. and is normally complete before a temperature of 300° C. is attained. In one experiment, 350 grams of $$CF_3CFHCONH_2$$

was mixed with 302 grams of $PCl_5$. The mixture was heated for about two hours by which time the reaction appeared to be complete. 170 grams of low boiling material was obtained which appeared to be almost entirely $CF_3CFHCN$. Fractionation produced a pure material boiling at 40.5–40.7° C. (775 mm.). The infrared spectrum indicated the presence of both C—H and C≡N groups.

This nitrile can be dehydrofluorinated in good yield to $CF_2=CF-CN$ by passage over agents such as chromia, potassium fluoride, potassium chloride, etc. at 500–800° C. The optimum temperature appears to be in the region of 600° C. when a carbon-lined iron pipe heated by a Hoskins furnace is used as a reactor and a flow rate of about 35 grams per hour is maintained. Under these conditions conversions of 40–50% per pass are obtained, with yields of better than 75%.

The perfluoroacrylonitrile, $CF_2=CF-CN$, boils at 16.4–16.5° C. and has characteristic absorption bands in the infrared at 1800 and 2300 cm.$^{-1}$. Its vapor density and analysis correspond closely to the theoretical values of 107, 33.5% N and 53.3% F.

A portion of the saturated ester $CF_3CFHCOOCH_3$ was hydrolyzed in aqueous sodium hydroxide, the solution evaporated to dryness, the residue extracted with acetone, and the acetone evaporated. The residue was added to 100% phosphoric acid and distilled. A fraction boiling at 120–121° with a neutral equivalent of 140 was identified as $CF_3CFHCO_2H$.

In order to produce the corresponding unsaturated perfluoro acid from the compound just named, that is, in order to produce perfluoroacrylic acid therefrom, it is necessary to carry out a controlled dehydrofluorination of such compound.

The amide, $CF_3CFHCONH_2$, was dehydrofluorinated by passage over pelleted potassium chloride at 600–800° C. The major product isolated was $CF_2=CF-CONH_2$ although some of the material was simultaneously dehydrated to $CF_2=CF-CN$.

The ester, $CF_3CFHCOOCH_3$, when passed over potassium chloride at 600–800° C., produces an unsaturated ester, as shown by the presence of the infrared absorption bands characteristic of C=C and $CO_2R$ and absorption of bromine to yield $CF_2BrCFBrCOOCH_3$, which latter boils at 55–60° C. at a pressure of 1 mm. of mercury, absolute.

A portion of the $CF_3CFHCF_2-OCH_3$ was passed over a potassium chloride catalyst at temperatures varying from 600 to 750° C., with best results at about 700° C. Dehydrofluorination occurred as evidenced by the formation of compounds showing the characteristic double-bond absorption in the infrared portion of the spectrum at 1720 cm.$^{-1}$; that is, the compound yielded was $$CF_2=CF-CF_2OCH_3$$

Our invention may be illustrated still further in the case where $R_fCF_2-CR'_f=CF_2$ is $CF_3CF_2CF=CF_2$, i. e. $C_4F_8$.

As in the example presented hereinabove where $C_3F_6$ was the starting material, $CF_3CF_2CF=CF_2$ was bubbled through a solution of 10% potassium hydroxide in methanol to produce the compound $CF_3CF_2CFHCH_2OCH_3$ which boiled at, roughly, 75° C.

The compound, $CF_3CF_2CFHCH_2OCH_3$, was hydrolyzed and the product, $CF_3CF_2CFHCOOCH_3$ isolated according to procedures described above. This product was found to boil at, roughly, 118° C.

The amide, $CF_3CF_2CFHCONH_2$, was prepared by treatment of the ester, $CF_3CF_2CFHCOOCH_3$, with ammonia. This amide was dehydrated to the nitrile, $CF_3CF_2CFHCN$, which latter was dehydrofluorinated to the αβ-unsaturated ester $CF_3CF=CFCOOCH_3$ which in turn produced the αβ-unsaturated acid upon hydrolysis.

By our methods, we believe we have been the first ever to produce unsaturated perfluoro acid, e. g. perfluoroacrylic acid and the anhydride, amide and ester derivatives thereof. We also believe that we have a superior method for producing unsaturated nitriles, e. g. perfluoroacrylonitrile. Our methods also lead to the production of a number of other compounds, already referred to, and these reactions proceed quite smoothly and with good yields, and avoid the hazards of direct fluorination processes and also avoid the use of metallic fluorides, e. g. $SbF_5$, commonly employed in the production of polyfluoro compounds.

Our perfluoroacrylic acid and other alpha beta unsaturated perfluoro acids provide an important new starting material for the production of polymers and copolymers. Heretofore perfluoro unsaturated compounds having three or more carbon atoms, available for the production of polymers or copolymers have been very limited and/or have been the result of processes which lack the desired commercial feasibility. Our present invention greatly expands the available unsaturated perfluoro compounds and correspondingly opens up many possibilities in respect to polymers and copolymers. Our invention provides compounds with functional groups heretofore unknown to industry or investigators.

Heretofore $CF_2=CF_2$ has been the only polymerizable perfluoroolefin which has been available commercially. Also the type and character of polymers or copolymers which could be made from this one material have been limited. Our invention involves the production of new and useful perfluoro unsaturated acids and derivatives thereof having three or more carbon atoms. The starting materials for our process, i. e. the $R_fCF_2CR'_f=CF_2$ may be produced as described, for example, in the co-pending application of Hals et al. Serial No. 138,264, filed January 12, 1950, now abandoned. The $$R_fCF_2CR'_f=CF_2$$

olefins produced according to the method of Hals et al. may employ as a starting material therefor the fluorocarbon acids, or the metallic salts of the fluorocarbon acids described in the co-pending application of Diesslin et al. Serial No. 70,154, filed January 10, 1949, now Patent No. 2,567,011.

While our invention has been described in a number of respects, it will be understood that these various specific steps have been given by way of illustration and not by way of limitation. The scope of the invention will be understood from the specification taken as a whole, in connection with the appended claims.

What we claim is:

As a new product, the chemical compound $$R_fCF_2CR'_fHCN$$

where $R_f$ and $R'_f$ are selected from the group consisting of perfluoroalkyl radicals and fluorine.

References Cited in the file of this patent

UNITED STATES PATENTS 2,514,473     Chaney  ---------------  July 11, 1950